United States Patent
Chen et al.

(10) Patent No.: US 11,632,208 B2
(45) Date of Patent: Apr. 18, 2023

(54) CHANNEL COVARIANCE FEEDBACK FOR ENHANCED FD-MIMO

(71) Applicant: QUALCOMM Incorporated, San Diego, CA (US)

(72) Inventors: Bo Chen, Beijing (CN); Chao Wei, Beijing (CN); Liangming Wu, Beijing (CN); Neng Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 16/078,434

(22) PCT Filed: Feb. 17, 2017

(86) PCT No.: PCT/CN2017/073872
§ 371 (c)(1),
(2) Date: Aug. 21, 2018

(87) PCT Pub. No.: WO2017/166940
PCT Pub. Date: Oct. 5, 2017

(65) Prior Publication Data
US 2019/0058560 A1    Feb. 21, 2019

(30) Foreign Application Priority Data
Mar. 31, 2016   (WO) ................ PCT/CN2016/078179

(51) Int. Cl.
*H04B 7/0417* (2017.01)
*H04L 5/00* (2006.01)
(Continued)

(52) U.S. Cl.
CPC ......... *H04L 5/0048* (2013.01); *H04B 7/0413* (2013.01); *H04B 7/0417* (2013.01);
(Continued)

(58) Field of Classification Search
CPC .... H04B 7/0413; H04B 7/063; H04B 7/0417; H04B 7/0626; H04B 7/0645; H04L 5/0048; H04W 24/08; H04W 24/10
See application file for complete search history.

(56) References Cited

U.S. PATENT DOCUMENTS

| 9,681,425 B2 | 6/2017 | Geirhofer et al. |
| 9,713,026 B2 | 7/2017 | Gaal et al. |

(Continued)

FOREIGN PATENT DOCUMENTS

| CN | 104202276 A | 12/2014 |
| JP | 2015513257 A | 4/2015 |

(Continued)

OTHER PUBLICATIONS

U.S. Appl. No. 62/286,151 of US 2016/0269084 A1 (Year: 2016).*
(Continued)

*Primary Examiner* — Michael Thier
*Assistant Examiner* — Jose L Perez
(74) *Attorney, Agent, or Firm* — Norton Rose Fulbright US LLP

(57) ABSTRACT

Channel covariance feedback is disclosed for enhanced full-dimension multiple input, multiple output (eFD-MIMO) systems. Channel state information (CSI) reference signal (CSI-RS) feedback operations are implemented using spatial covariance feedback of a covariance estimate. After obtaining a set of orthogonal basis vectors, a user equipment (UE) measures the CSI-RS from a base station and determines the spatial covariance matrix from the signal. The UE may then compress the spatial covariance matrix into a lower-dimension covariance estimate matrix using the orthogonal basis vectors. The lower-dimension matrix along with element-
(Continued)

wise quantization allows for feedback of spatial covariance for eFD-MIMO systems without excessive feedback overhead.

25 Claims, 12 Drawing Sheets

(51) Int. Cl.
    *H04B 7/06*     (2006.01)
    *H04B 7/0413*     (2017.01)
    *H04W 24/08*     (2009.01)
    *H04W 24/10*     (2009.01)

(52) U.S. Cl.
    CPC ........... *H04B 7/063* (2013.01); *H04B 7/0626* (2013.01); *H04W 24/08* (2013.01); *H04W 24/10* (2013.01); *H04B 7/0645* (2013.01)

(56) References Cited

U.S. PATENT DOCUMENTS

| | | | |
|---|---|---|---|
| 2010/0202548 A1* | 8/2010 | Sanayei | H04B 7/0417 375/260 |
| 2011/0164696 A1 | 7/2011 | Choi et al. | |
| 2011/0200081 A1* | 8/2011 | Guo | H04B 7/0417 375/267 |
| 2013/0094548 A1 | 4/2013 | Park | |
| 2013/0172002 A1* | 7/2013 | Yu | H04L 1/0668 455/452.1 |
| 2014/0098689 A1* | 4/2014 | Lee | H04B 7/0639 370/252 |
| 2014/0177745 A1* | 6/2014 | Krishnamurthy | H04B 7/0413 375/267 |
| 2014/0226702 A1* | 8/2014 | Onggosanusi | H04B 7/0478 375/219 |
| 2014/0307815 A1* | 10/2014 | Alex | H04L 25/0202 375/267 |
| 2015/0341093 A1 | 11/2015 | Ji et al. | |
| 2016/0065282 A1 | 3/2016 | Zhang et al. | |
| 2016/0072562 A1* | 3/2016 | Onggosanusi | H04B 7/0478 370/329 |
| 2016/0142117 A1* | 5/2016 | Rahman | H04B 7/0486 375/267 |
| 2016/0149630 A1* | 5/2016 | Liu | H04B 7/0478 370/329 |
| 2016/0156397 A1* | 6/2016 | Onggosanusi | H04B 7/0421 370/252 |
| 2016/0269084 A1* | 9/2016 | Nam | H04B 7/0626 |
| 2016/0359538 A1* | 12/2016 | Onggosanusi | H04B 7/0469 |
| 2017/0134082 A1* | 5/2017 | Onggosanusi | H04B 7/0478 |
| 2017/0244533 A1* | 8/2017 | Onggosanusi | H04B 7/0478 |
| 2017/0257884 A1* | 9/2017 | Rahman | H04B 7/065 |
| 2017/0279509 A1* | 9/2017 | Rahman | H04B 7/0639 |
| 2017/0279514 A1* | 9/2017 | Rahman | H04L 5/0048 |
| 2017/0373744 A1* | 12/2017 | Fröberg | H04B 7/024 |
| 2018/0219603 A1* | 8/2018 | Park | H04B 7/0639 |
| 2018/0278313 A1* | 9/2018 | Kim | H04B 7/0413 |
| 2019/0036579 A1* | 1/2019 | Wei | H04B 7/0486 |
| 2019/0132031 A1* | 5/2019 | Park | H04B 7/0478 |

FOREIGN PATENT DOCUMENTS

| | | |
|---|---|---|
| WO | WO-2013169666 A2 | 11/2013 |
| WO | WO-2014186456 A1 | 11/2014 |
| WO | 2016039565 A1 | 3/2016 |

OTHER PUBLICATIONS

ZTE, (R1-154378, Discussion on CSI Process and CSI-RS Resource Definitions), Aug. 24-28, 2015, 3GPP TSG RAN WG1 Meeting #82, Beijing, China (Year: 2015).*
Rahman et al. U.S. Appl. No. 62/301,823 of US 20170257884 A1, Mar. 1, 2016, USPTO, whole document (Year: 2016).*
Motorola, (R1-094844, Low-Overhead Feedback of Spatial Covariance Matrix), Nov. 9-13, 2009, 3GPP TSG RAN1#59, Jeju, South Korea (Year: 2009).*
Nam et al., U.S. Appl. No. 62/286,151 of US 2016/0269084 A1, Jan. 22, 2016, USPTO, whole document (Year: 2016).*
3GPP: "Study on Elevation Beamfoming/Full-Dimension (FD) MIMO for LTE," 3GPP TR 36.897 V13.0.0, Release 13, Jun. 30, 2015, 58 pages.
3GPP TSG-RAN WG1: "LS on EB/FD-MIMO Terminologies," Meeting #84, R1-161336, Feb. 15-19, 2016, 1 page.
Intel Corporation: "Potential performance improvement in FD-MIMO systems," 3GPP TSG-RAN WG1#76, R1-140126, Feb. 14, 2014, 3 D:\New folder\New folderpages.
International Search Report and Written Opinion—PCT/CN2016/078179—ISA/EPO—dated Dec. 26, 2016.
International Search Report and Written Opinion—PCT/CN2017/073872—ISA/EPO—dated May 22, 2017.
Marvell Covariance: "Compression for Codebook Adaptation," 3GPP TSG-RAN WG1#60bis, R1-101790, Apr. 16, 2010, 6 pages.
Motorola: "Low-Overhead Feedback of Spatial Covariance Matrix," 3GPP TSG RAN1#59 R1-094844, Nov. 13, 2009, 7 pages.
CATT: "Beam selection for CSI-RS beamforming", 3GPP Draft; R1-151365, 3rd Generation Partnership Project (3GPP), Mobile Competence Centre ; 650, Route Des Lucioles ; F-06921 Sophia-Antipolis Cedex; France, vol. RAN WG1, No. Belgrade, Serbia; Apr. 20, 2015-Apr. 24, 2015, Apr. 19, 2015 (Apr. 19, 2015), XP050934240, 5 Pages, Retrieved from the Internet: URL:http://www.3gpp.org/ftp/Meetings_3GPP_SYNC/RAN1/Docs/ [retrieved on Apr. 19, 2015].
Motorola: "Spatial Correlation Feedback to Support LTE-A MU-MIMO and CoMP: System Operation and Performance Results", 3GPP Draft; R1-092221 UE Feedback (Revised From 091936), 3rd Generation Partnership Project (3GPP), Mobile Competence Centre;650, Route Des Lucioles; F-06921 Sophia-Antipolis Cedex ; France, No. San Francisco, USA; May 7, 2009, May 7, 2009 (May 7, 2009), XP050339645, 11 Pages, [retrieved on May 7, 2009].
Supplementary European Search Report—EP17772971—Search Authority—Munich—dated Sep. 20, 2019.
ZTE: "Discussion on CSI Process and CSI-RS Resource Definitions", 3GPP Draft; R1-154378 Discussion on CSI Process and CSI-RS Resource Definitions, 3rd Generation Partnership Project (3GPP), Mobile Competence Centre ; 650, Route Des Lucioles ; F-06921 Sophia-Antipolis, vol. RAN WG1, No. Beijing, China; Aug. 24, 2015-Aug. 28, 2015, Aug. 23, 2015 (Aug. 23, 2015), XP051001690, 6 Pages, Retrieved from the Internet: URL:http://www.3gpp.org/ftp/Meetings_3GPP_SYNC/RAN1/Docs/ [retrieved on Aug. 23, 2015].
Samsung: "CSI Test Case Design for Class A", 3GPP TSG-RAN WG4 Meeting #78, R4-160072, Malta, Feb. 15, 2016-Feb. 19, 2016, 11 Pages, Feb. 4, 2016 upload, Internet URL: https://www.3gpp.org/ftp/TSG_RAN/WG4_Radio/TSGR4_78/Docs/R4-160072.zip.
Samsung: "Draft CR on Mismatched FD-MIMO Configuration Fields Between 36.213 and 36.331", 3GPP TSG RAN WG1 Meeting #84, R1-160522, St. Julian's, Malta, Feb. 15, 2016-Feb. 19, 2016, 61 Pages, Feb. 5, 2016 upload, Internet URL: https://www.3gpp.org/ftp/TSG_RAN/WG1_RL1/TSGR1_84/Docs/R1-160522.zip.
Samsung: "Handling Collision Between NonPrecoded Type and Beamformed Type CSI Reports", 3GPP TSG RAN WG1 Meeting #84, R1-160534, St Julian's, Malta, Feb. 15, 2016-Feb. 19, 2016, 4 Pages, Feb. 5, 2016 upload, Internet URL: https://www.3gpp.org/ftp/TSG_RAN/WG1_RL1/TSGR1_84/Docs/R1-160534.zip.

* cited by examiner

CHANNEL COVARIANCE FEEDBACK FOR ENHANCED FD-MIMO

CROSS-REFERENCE TO RELATED APPLICATIONS

This application claims the benefit of PCT/CN2016/078179, entitled, "CHANNEL COVARIANCE FEEDBACK FOR ENHANCED FD-MIMO," filed on Mar. 31, 2016, which is expressly incorporated by reference herein in its entirety.

BACKGROUND

Field

Aspects of the present disclosure relate generally to wireless communication systems, and more particularly, to channel covariance feedback for enhanced full dimension multiple input, multiple output (eFD-MIMO) systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks. Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes obtaining a set of orthogonal basis vectors, measuring a channel state information (CSI) reference signal (CSI-RS) received from a base station, determining a spatial covariance of the CSI-RS, compressing the spatial covariance into a covariance estimate using the set of orthogonal basis vectors, and transmitting the covariance estimate to the base station.

In an additional aspect of the disclosure, an apparatus configured for wireless communication includes means for obtaining a set of orthogonal basis vectors, means for measuring a CSI-RS received from a base station, means for determining a spatial covariance of the CSI-RS, means for compressing the spatial covariance into a covariance estimate using the set of orthogonal basis vectors, and means for transmitting the covariance estimate to the base station.

In an additional aspect of the disclosure, a non-transitory computer-readable medium having program code recorded thereon. The program code further includes code to obtain a set of orthogonal basis vectors code to measure a CSI-RS received from a base station, code to determine a spatial covariance of the CSI-RS, code to compress the spatial covariance into a covariance estimate using the set of orthogonal basis vectors, and code to transmit the covariance estimate to the base station.

In an additional aspect of the disclosure, an apparatus configured for wireless communication is disclosed. The apparatus includes at least one processor, and a memory coupled to the processor. The processor is configured to obtain a set of orthogonal basis vectors code to measure a CSI-RS received from a base station, to determine a spatial covariance of the CSI-RS, to compress the spatial covariance into a covariance estimate using the set of orthogonal basis vectors, and to transmit the covariance estimate to the base station.

In an additional aspect of the disclosure, a method of wireless communication includes measuring a non-precoded channel state information (CSI) reference signal (CSI-RS) received from a base station, obtaining a set of orthogonal basis vectors, measuring a beamformed CSI-RS received from a base station, generating a CSI report based on measurement of the beamformed CSI-RS, and transmitting the CSI report to the base station.

In an additional aspect of the disclosure, an apparatus configured for wireless communication includes means for measuring a non-precoded CSI-RS received from a base station, means for obtaining a set of orthogonal basis vectors, means for measuring a beamformed CSI-RS received from a base station, means for generating a CSI report based on measurement of the beamformed CSI-RS, and means for transmitting the CSI report to the base station.

In an additional aspect of the disclosure, a non-transitory computer-readable medium having program code recorded thereon. The program code further includes code to measure a non-precoded CSI-RS received from a base station, code to obtain a set of orthogonal basis vectors, code to measure a beamformed CSI-RS received from a base station, code to generate a CSI report based on measurement of the beamformed CSI-RS, and code to transmit the CSI report to the base station.

In an additional aspect of the disclosure, an apparatus configured for wireless communication is disclosed. The apparatus includes at least one processor, and a memory coupled to the processor. The processor is configured to measure a non-precoded CSI-RS received from a base station, to obtain a set of orthogonal basis vectors, to measure a beamformed CSI-RS received from a base station, to generate a CSI report based on measurement of the beamformed CSI-RS, and to transmit the CSI report to the base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
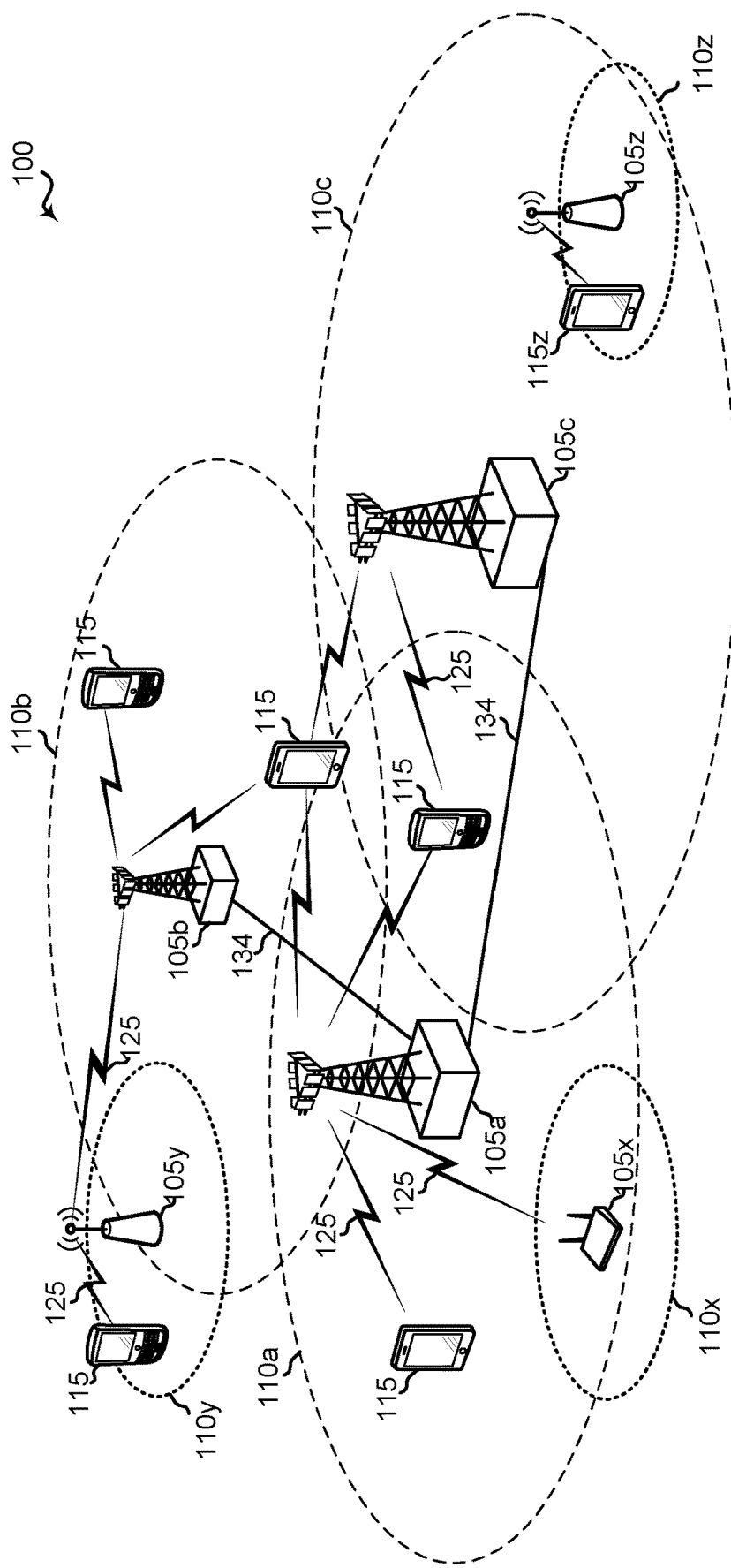
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI). Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the cNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro cNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
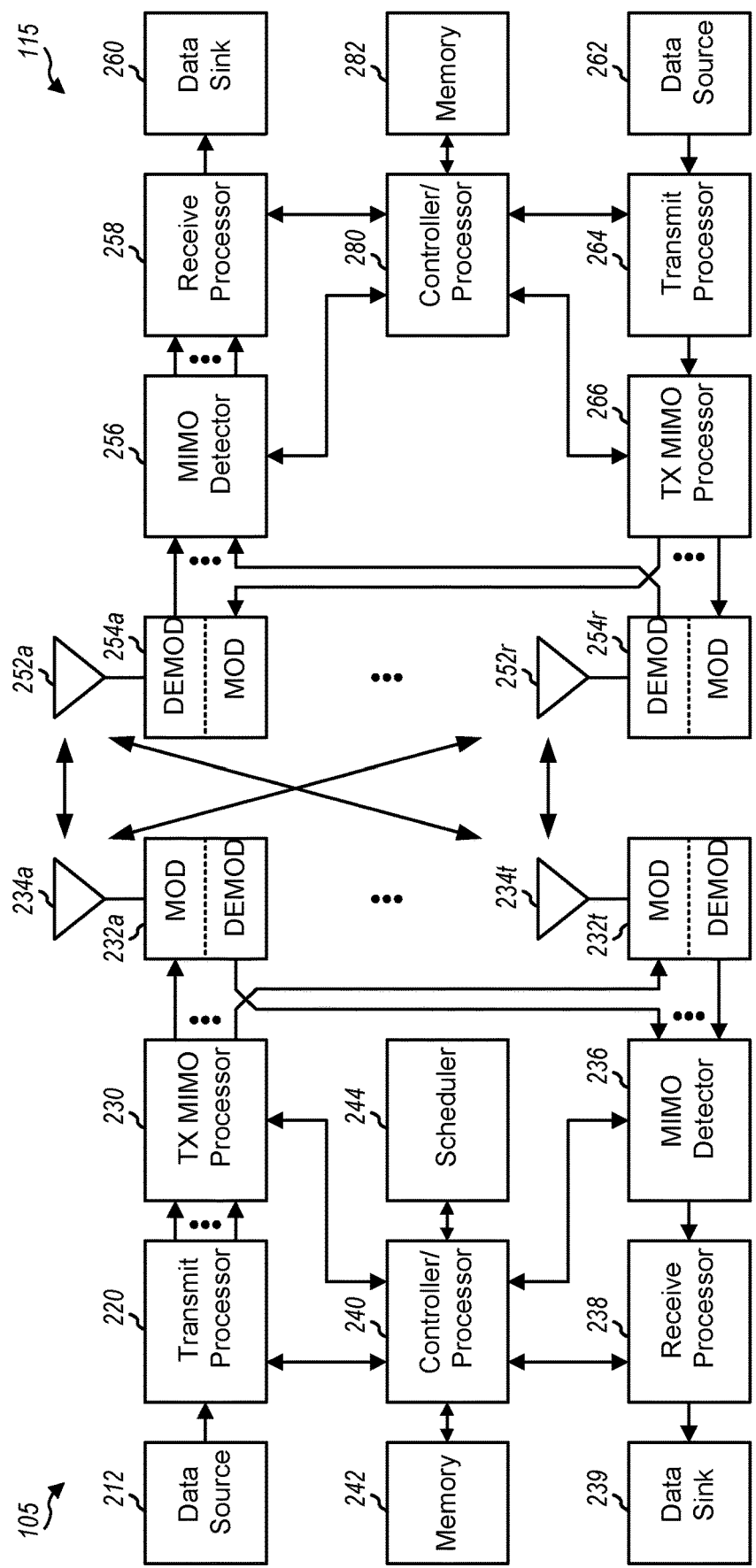
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
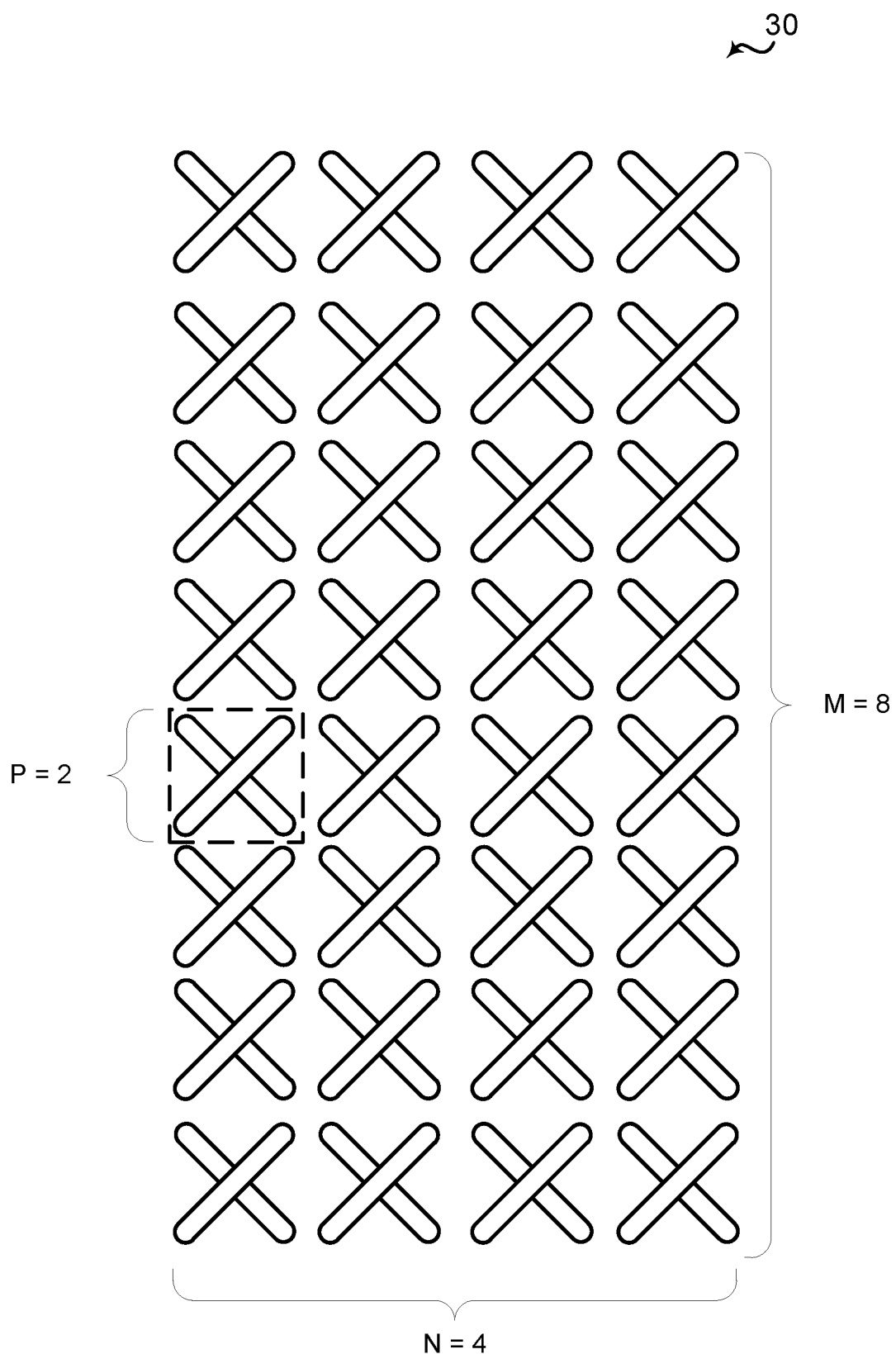
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
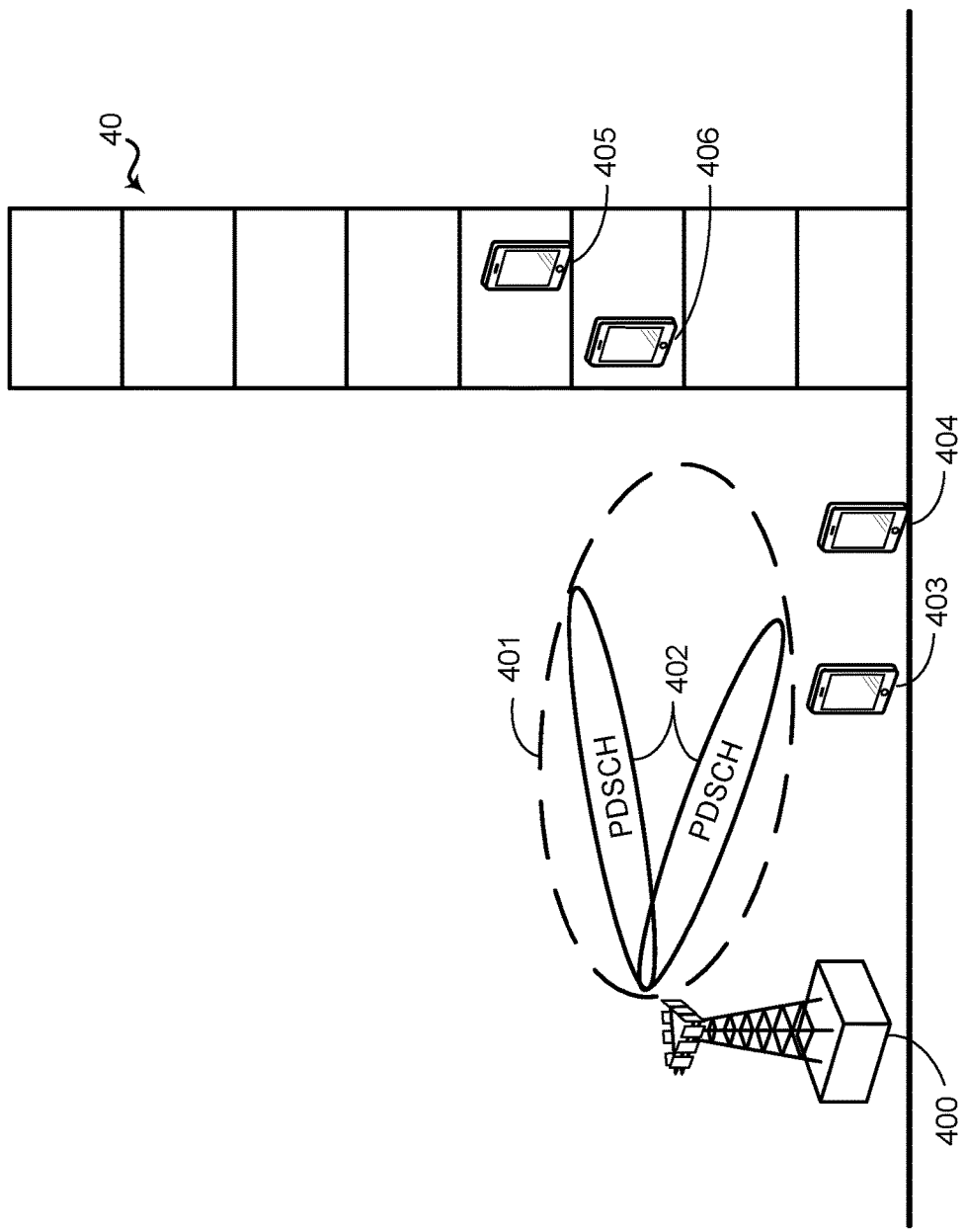
FIG. 4A is a block diagram illustrating an example base station transmitting non-precoded CSI-RS.

For CSI reporting in systems having FD-MIMO, a CSI process may be configured with either of two CSI reporting classes, class A non-precoded or class B beamformed. FIG. 4A is a block diagram illustrating an example base station 400 transmitting non-precoded CSI-RS 401. In class A non-preceded reporting, one non-zero power (NZP) CSI-RS resource per CSI process may be used for channel measurement in which the number of CSI-RS ports may be 8, 12, or 16. Interference measurement in class A reporting may include one CSI-interference measurement (IM) resource per CSI process.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, preceding matrix indicator (PMI) (2D codebook), and rank indicator to base station 400.

Figure 4B:
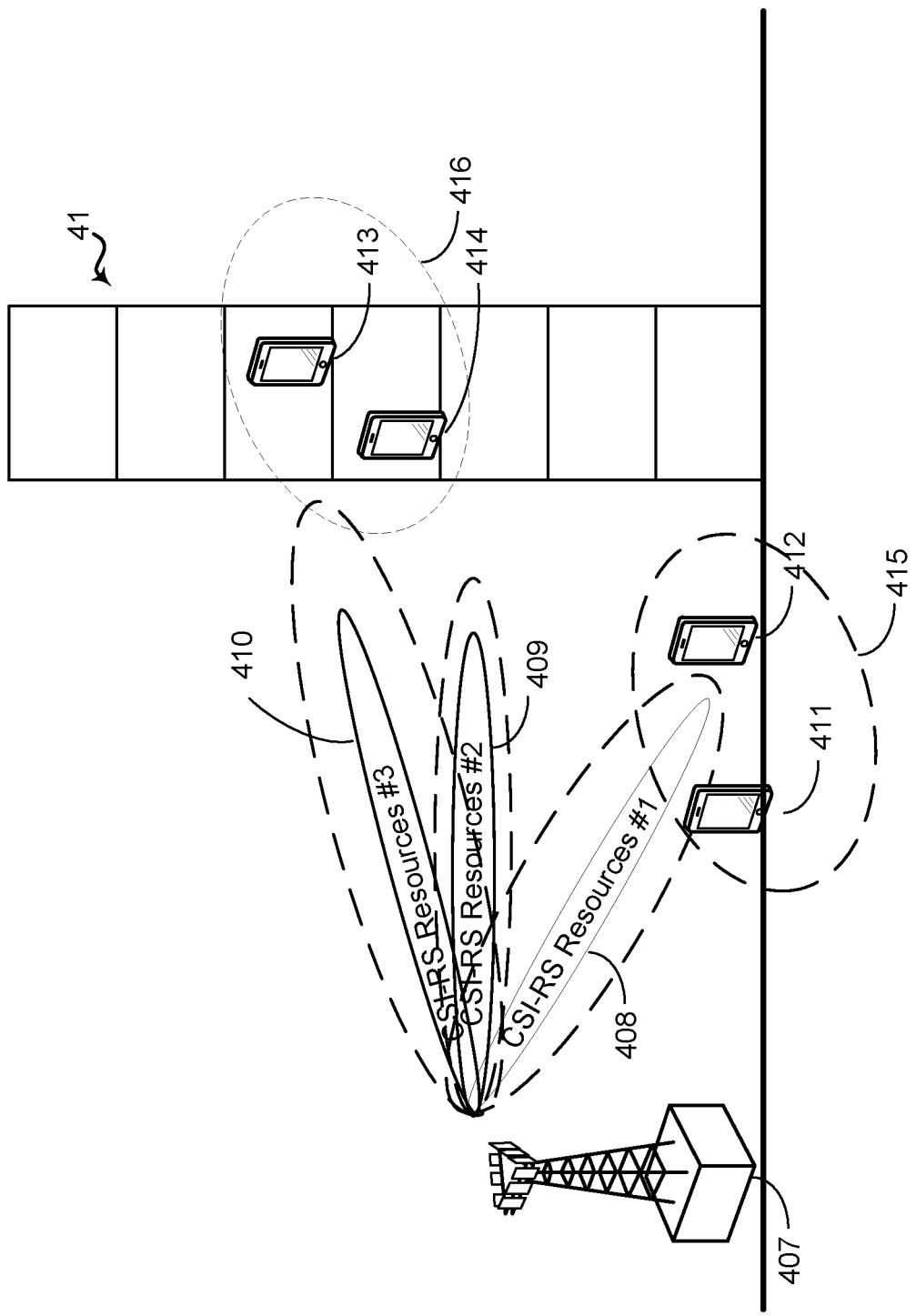
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (1D codebook), rank indicator, as well as the CSI-RS resource indicator (CRI), if K>1, which identifies to base station 407 which of the CSI-RS resources the UE has measured and provided channel state information (CSI) feedback for.

In class B beamformed CSI reporting, each CSI process may be associated with K NZP CSI-RS resources/configurations, with $N_k$ ports for the $k^{th}$ CSI-RS resource (K could be >1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-IM per CSI process is also possible, with one-to-one linkage to each NZP CSI-RS resource.

For both conventional MIMO and FD-MIMO in LTE, implicit feedback is applied, for which the codebook is based on the discrete Fourier transform (DFT) vector with the assumption of the single path channel. The performance of the DFT vector based codebook for the channel with multiple paths and rays is limited and not sufficient for multiple user precoding which uses accurate CSI to adequately steer a null for reducing multiple user interference. For beamformed CSI-RS, the performance is more sensitive to precoding accuracy due to the very narrow CSI-RS beam and using the DFT vector based PMI feedback for CSI-RS beamforming may degrade beamformed CSI-RS performance. Explicit spatial covariance feedback can provide significant performance gain compared with PMI based schemes. However, element-wise quantization of the spatial covariance may not be practical for FD-MIMO with a larger number of antenna ports such as 32 or 64 antenna ports, due to a very large feedback overhead.

Various aspects of the present disclosure may provide for use of spatial covariance feedback based on an estimated spatial covariance. A spatial covariance matrix can be approximated via two steps: 1) finding a set of orthogonal basis vectors $\{\psi_i\}$; and 2) compressing the covariance matrix into a low dimension matrix by projecting eigenvectors onto N orthogonal basis vectors. Denoting the spatial covariance matrix as $\hat{R}$, which can be computed from the channel estimated from CSI-RS and accumulated over the whole band or sub-band, over a small or long period of time $$\hat{R} = \frac{1}{|S|} \sum_{k \in S} H_k^H H_k,$$

where S is a set of subcarriers, or a set of subframes for averaging. Using the orthogonal $N_T \times N$ matrix $\Psi=[\psi_1, \ldots, \psi_N]$, a low dimension $N \times N$ matrix $A = \Psi^H \hat{R} \Psi$ may be generated, where $N_T$ is number of transmit antenna ports and N is the number of selected basis vectors, where $N \ll N_T$. It can be seen that $\Psi A \Psi^H = \Psi \Psi^H \hat{R} \Psi \Psi^H = (\Psi \Psi^H U) \Sigma (U^H \Psi \Psi^H)$, where $\hat{R} = U \Sigma U^H$ and $U = [u_1, \ldots, u_{N_T}]$. If the set of basis vector $\{\psi_i\}$ is chosen to cover the signal subspace of interest, $\Psi \Psi^H u_i$ is an approximation of principle eigenvector $u_i$ of covariance $\hat{R}$ by projecting it onto the orthogonal basis vector. In this instance, $\Psi \Psi^H u_i$ is an approximation of the eigenvector of $\Psi A \Psi^H$, which can be computed by the product of the selected set of orthogonal basis vectors, $\Psi$, and eigenvector of the low dimension covariance estimate matrix, A. Since A is a low dimension matrix, the computational efforts for the eigenvector may be very low. Therefore, the low dimension matrix A and the basis vector $\{\psi_i\}$ provide a good approximation of $\hat{R}$. Based on A and $\{\psi_i\}$, the eNB can derive the principle eigenvector of $\hat{R}$.

Figure 5:
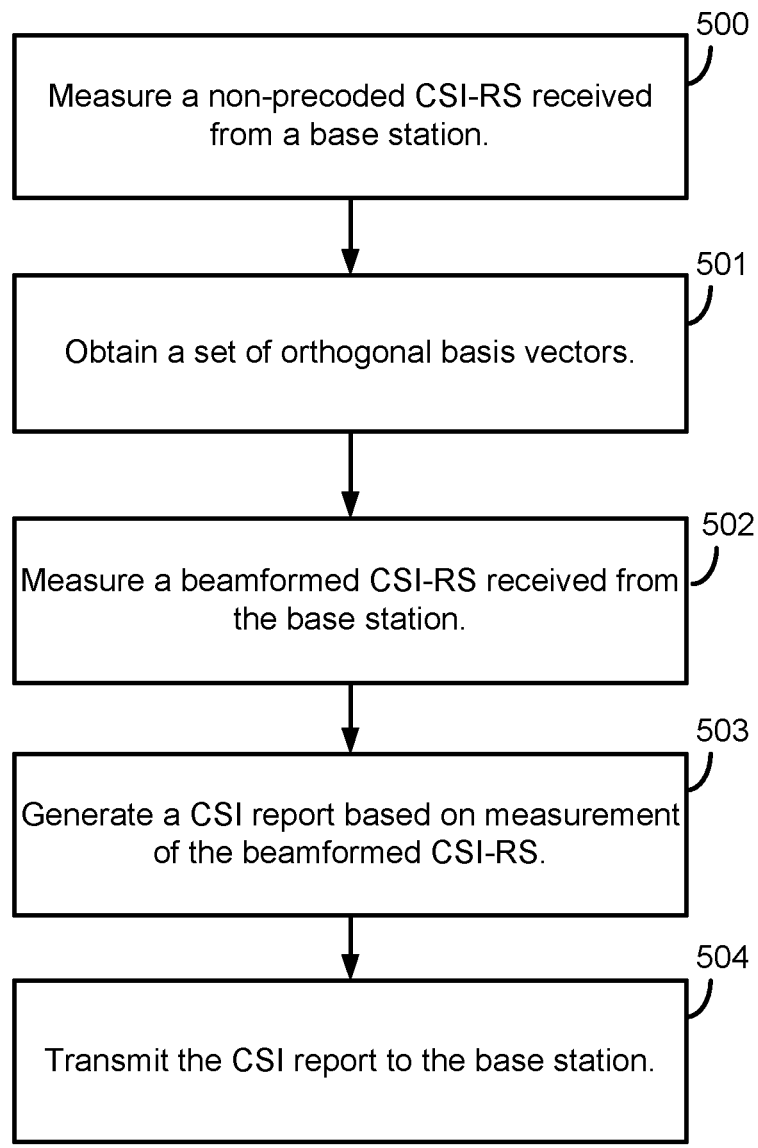
FIG. 5 is a block diagram illustrating example blocks executed to implement one aspect of the present disclosure.
Figure 10:
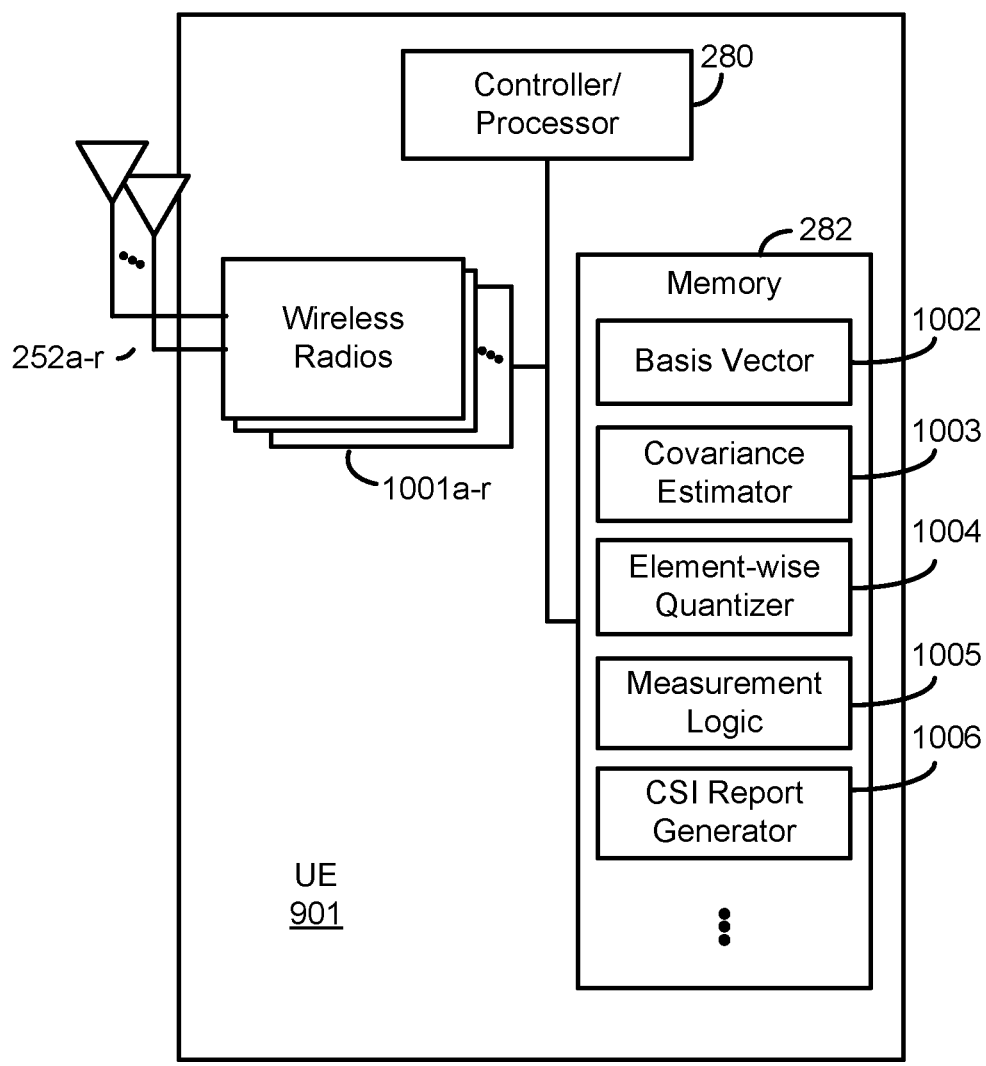
FIG. 10 is a block diagram illustrating a UE configured according to one aspect of the present disclosure.

FIG. 5 is a block diagram illustrating example blocks executed to implement one aspect of the present disclosure. The example blocks will also be described with respect to UE 901 as illustrated in FIG. 10. FIG. 10 is a block diagram illustrating UE 901 configured according to one aspect of the present disclosure. UE 901 includes the structure, hardware, and components as illustrated for UE 115 of FIG. 2. For example, UE 901 includes controller/processor 280, which operates to execute logic or computer instructions stored in memory 282, as well as controlling the components of UE 901 that provide the features and functionality of UE 901. UE 901, under control of controller/processor 280, transmits and receives signals via wireless radios 1001a-r and antennas 252a-r. Wireless radios 1001a-r includes various components and hardware as illustrated in FIG. 2 for UE 115, including demodulator/modulators 254a-r, MIMO detector 256, receive processor 258, transmit processor 264, and TX MIMO processor 266.

At block 500, the UE measures a non-precoded CSI-RS received from the base station. For example, UE 901 receives and detects the non-precoded CSI-RS via antennas 252a-r and wireless radios 1001a-r. Upon executing measurement logic 1005, under control of controller/processor 280, measurements of the non-precoded CSI-RS are made.

At block 501, a UE, such as UE 901, obtains a set of orthogonal basis vectors. UE 901 may obtain the set of basis vectors from a base station through configuration signals or may determine the basis vectors on its own. For example, the orthogonal basis vector may be selected by UE 901 through execution of covariance estimator logic 1003 stored in memory 282 and executed by controller/processor 280. In the example aspect in which UE 901 determines the set of basis vectors, the execution environment of covariance estimator logic 1003 determines a set of DFT vectors based on signals received from the base station. UE 901, under control of controller/processor 280, may select the set of basis vectors from a set of DFT vectors $$\psi_{k,l} = \frac{1}{\sqrt{N_1 N_2}} \times \phi_k \otimes \theta_l \text{ and}$$

$$\phi_k = \left[1, e^{-j\frac{2\pi k}{O_1 N_1}}, \ldots, e^{-j(N_1-1)\frac{2\pi k}{O_1 N_1}}\right]^T,$$

$$\phi_l = \left[1, e^{-j\frac{2\pi l}{O_2 N_2}}, \ldots, e^{-j(N_1-1)\frac{2\pi l}{O_2 N_2}}\right]^T,$$

where $k=0, 1, \ldots, O_1 N_1 - 1$ and $l=0, 1, \ldots, O_2 N_2 - 1$ are the DFT beam indices. $N_1$ and $N_2$ are the number of antenna ports in elevation and azimuth dimension, respectively, $O_1$ and $O_2$ are oversampling factors producing overlapping DFT beams. A subset of the DFT vectors $\Psi = \{(\phi_k, \theta_l)\}$ or $\Psi = \{(\psi_{k,l})\}$ is chosen by UE 901 as the basis vector for spatial covariance compression by the following steps. First, UE 901 finds the dominant DFT vector, e.g., $\psi_{k',l'} = \arg\max_{(k,l)}(\psi_{k,l}^H \cdot R \cdot \psi_{k,l})$. Second, UE 901 determines a set of DFT vectors that are orthogonal to the selected DFT vector from the first, e.g., $\{\psi_{k'+mo_1, l'+no_2}\}$, $m=0, 1, \ldots, N_1-1$ and $n=0, 1, \ldots N_2-1$. Finally, UE 901 down-selects the orthogonal DFT vectors by removing the DFT vectors having smaller values, e.g., $(m',n') = \arg\max_{(m,n)} \{\psi_{k'=mo_1,l'+no_2}^H \cdot R \cdot \psi_{k'=mo_1,l'+no_2} > T \cdot \psi_{k',l'}^H \cdot R \cdot \psi_{k',l'}\}$ where T is threshold. The selected set of orthogonal basis vectors is stored at basis vectors 1002 in memory 282.

At block 502, the UE measures a beamformed CSI-RS received from the base station. For example, UE 901 receives and detects the beamformed CSI-RS via antennas 252a-r and wireless radios 1001a-r. Upon executing measurement logic 1005, under control of controller/processor 280, measurements of the beamformed CSI-RS are made.

At block 503, the UE generates a CSI report based on the measurement of the beamformed CSI-RS. For example, UE 901, under control of controller/processor 280, executes CSI report generator 1006, stored in memory 282. The execution environment of CSI report generator 1006 uses the measurements of the beamformed CSI-RS to generate the CSI report to be communicated.

At block 504, the UE transmits the CSI report to the base station. For example, as a part of the CSI feedback operation, UE 901, transmits the CSI report back to the base station via mobile radios 1001a-r and antennas 252a-r.

Figure 6:
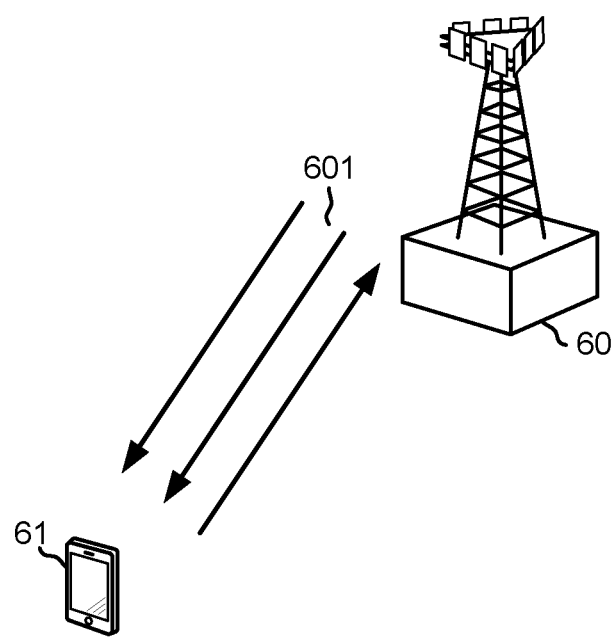
FIG. 6 is a block diagram illustrating a UE and an eNB configured according to aspects of the present disclosure.

FIG. 6 is a block diagram illustrating eNB 60 and UE 61 configured according to one aspect of the present disclosure. In the illustrated aspect, eNB 60 configures the basis vector for spatial covariance compression. eNB 60 may determine the basis vector based on an estimate of the uplink received signal from UE 61 (not shown), e.g., a subset $\Psi = \{(\psi_{k,l})\}$ with $k=0, 1, \ldots, O_2 N_2 - 1$ and $l=0, 1, \ldots, O_2 N_2 - 1$ are configured based on long-term channel property. Once receiving the configuration from eNB 60, UE 61 measures CSI-RS 601 to determine the spatial channel covariance and computes a low dimension covariance approximation $A = \Psi^H \hat{R} \Psi$. For example, UE 901 (FIG. 10), under control of controller/processor 280, executes covariance estimator 1003. The execution environment of covariance estimator 1003 generates the spatial covariance matrix, $\hat{R}$, based on the measurements of the CSI-RS. The UE compresses the spatial covariance into a covariance estimate using the set of orthogonal basis vectors. For example, UE 901, under control of controller/processor 280, in the operation environment of the executing covariance estimator 1003, the spatial covariance matrix is compressed into a low dimension covariance estimate matrix, A, according to the relationship:

$$A = \Psi^H \hat{R} \Psi$$

where $\Psi$ is the set of orthogonal basis vectors and $\hat{R}$ is the spatial covariance. The execution environment of covariance estimator 1003, thus, uses the orthogonal basis vectors and determined spatial covariance to produce a covariance estimate that is a lower dimension matrix than the determined spatial covariance $\hat{R}$. UE 61 may then feed back the quantized A 601 to eNB 60. As indicated above, it is also possible that eNB 60 only configures the number of basis vectors. In such case, UE 61 may feed back the index of the determined basis vectors and also the quantized A 601 to eNB 60.

In such aspects in which UE 901 feeds back the index of the determined basis vector $\{(\psi_{k,l})\}$ and it may also feed back the number of basis vectors. In additional aspects in which the orthogonal basis vectors are configured by the base station, UE 901 may only feed back the covariance estimate without the index of the determined basis vectors or number of basis vectors. Additionally, alternative aspects may provide for the base station to configure the number of basis vectors with UE 901 determining the set of orthogonal vectors using the number of basis vectors from the base station. In such additional aspects, UE 901 may feed back the covariance estimate and the index of the determined basis vector.

After compressing the spatial covariance, $\hat{R}$, into the covariance estimate, A, overhead for the covariance feedback may be further reduced through quantization. For the set of basis vector, $\{\psi_i\}$ i=0, ..., N−1 where the number of basis vector N denotes the maximum rank, the low dimension matrix, A, is expressed as $A=\Psi^H\hat{R}\Psi$. Because $N \ll N_T$, it is possible to apply element-wise quantization for A. The overhead can be further reduced by exploiting Hermitian symmetry. For N=2, A is a 2×2 matrix with three unique entries or two real values for diagonal entries and one complex entry. For N=4, A is a 4×4 matrix with 10 unique entries or four real values for diagonal entries and six complex entry. The real entry corresponding to the $i^{th}$ diagonal denoted by $\hat{a}_{ii}$ may be normalized using a multiple bit uniform quantization and complex entries may be quantized using a multiple bit uniform quantization for phase in [0, $2\pi$] and a multiple bit uniform quantization of the amplitude. The multiple bit quantization may be implemented as 2-bit, 4-bit, or the like. In one example aspect, a 4-bit uniform quantization may be used. In such example aspect, the total quantization overhead for A is $C_N^1 \times 4 + C_N^2 \times 8$, e.g., 4*2+1*2*4=16 bits for N=2 and 4*4+6*2*4=64 bits for N=4.

Figure 7A:
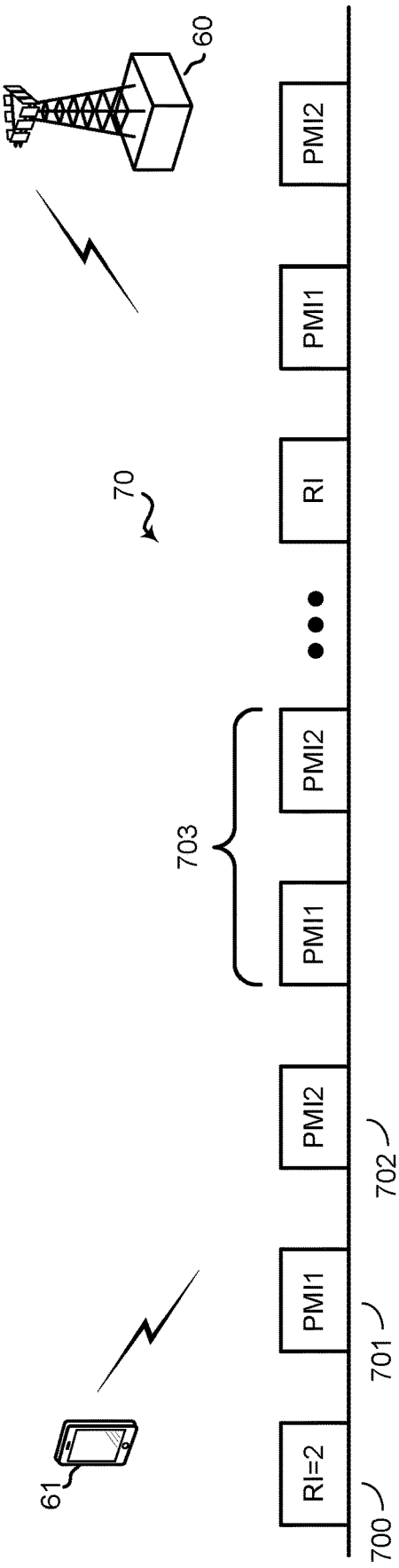
FIGS. 7A-7B are block diagrams illustrating a CSI reporting stream from a UE configured according to aspects of the present disclosure.
Figure 7B:
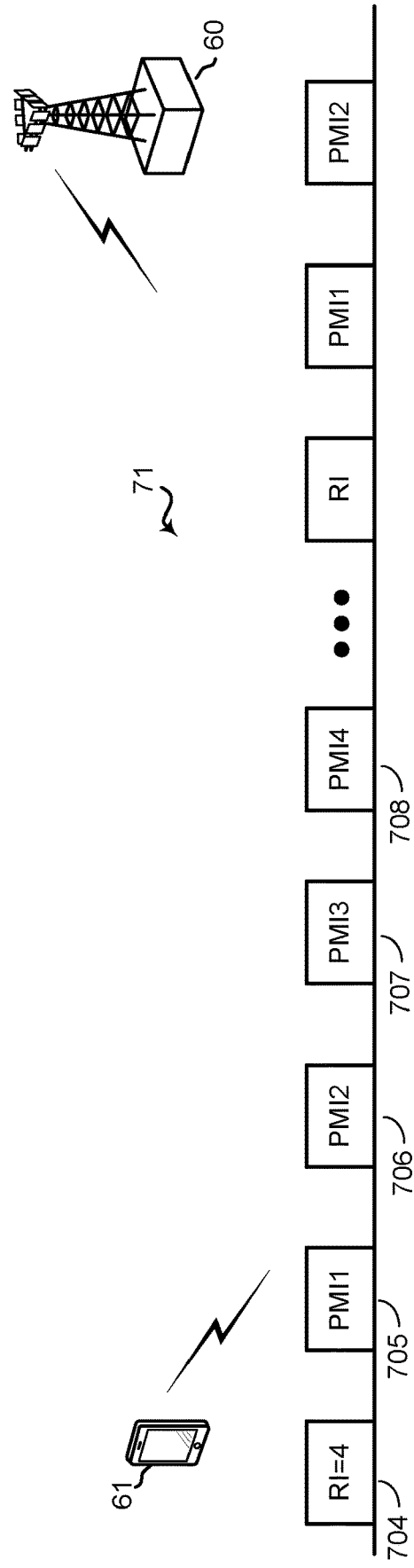

FIGS. 7A and 7B are block diagrams illustrating CSI reporting streams 70 and 71 from eNB 60 and UE 61 configured according to aspects of the present disclosure. For periodic CSI reporting, UE 61 shall report a first RI 700/704 corresponding to the number of determined basis vectors $\{(\psi_{k,l})\}$, and second reports 701-702/705-708 including the set of determined basis vector $\{(\psi_{k,l})\}$ and the beam index (k, l). The beam indices (PMIs) of the determined basis vectors will be reported cyclically, as illustrated at 703, according to the order from the best to the worst. It should be noted that the period of the first report is $M_{RI} \cdot N_{pd}$ subframes. The period of each basis vector in second report is $N_{RI}*N_{pd}$ subframes, where $N_{RI}$ is determined from the last report RI. Both $M_{RI}$ and $N_{pd}$ may be configured by the higher-layer signaling.

For aperiodic CSI reporting, UE 61 may report the number of determined basis vector $\{(\psi_{k,l})\}$ and associated beam indices, the element-wise quantization coefficients $\{a_{i,j}\}$ of matrix A to eNB 60. The coefficients and indices of the basis vector may be reported separately or jointly in the same subframe according to CSI triggering signaling from eNB 60. Table 1 below identifies an example of overhead estimation for spatial covariance feedback for a 32 x-pol antenna array configured for spatial covariance estimation according to various aspects of the present disclosure.

TABLE 1

| | N = 2 | N = 4 |
|---|---|---|
| $(N_1, N_2, O_1, O_2) = (8, 2, 8, 8)$ | | |
| Indices of basis vector | 2 × 10 = 20 bits | 4 × 10 = 40 bits |
| Coefficients of matrix A | 4 × 2 + 1 × 2 × 4 = 16 bits | 4 × 4 + 6 × 2 × 4 = 64 bits |
| Total Overhead | 36 bits | 104 bits |

Figure 8:
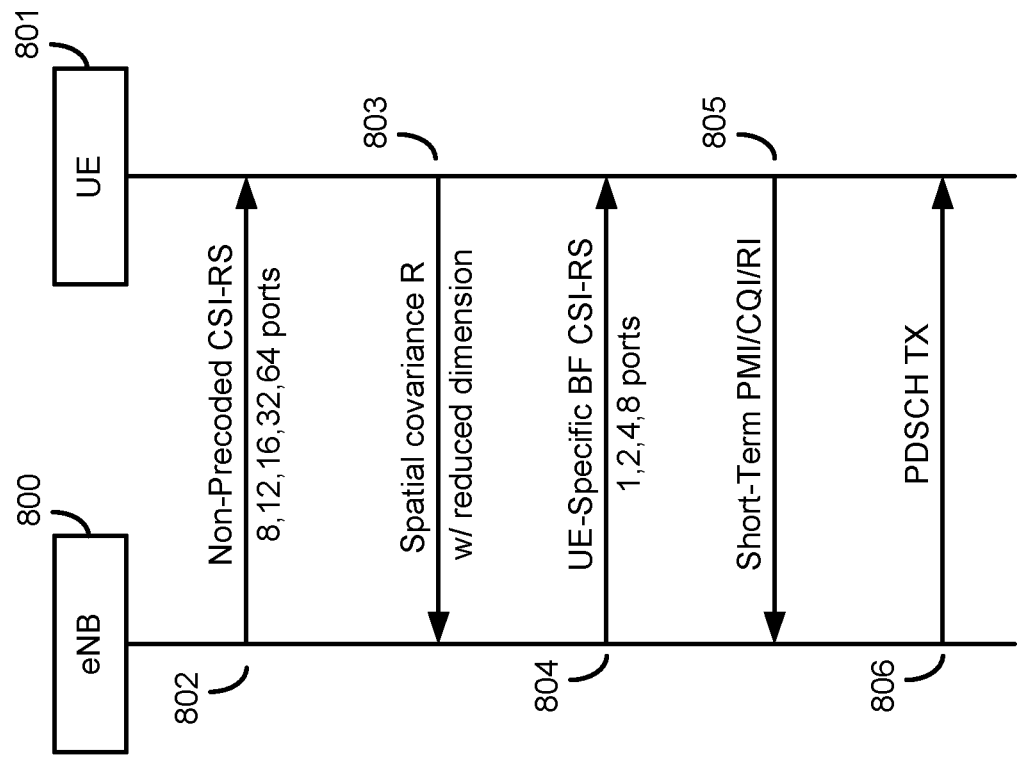
FIG. 8 is a block diagram illustrating a communication dialog between a UE and eNB configured according to one aspect of the present disclosure.

FIG. 8 is a block diagram illustrating a communication dialog between a UE 800 and eNB 801 configured according to one aspect of the present disclosure. The proposed spatial covariance feedback approach may enhance hybrid CSI-RS based FD-MIMO with two stage feedback. At 802, eNB 800 transmits non-precoded CSI-RS (e.g., configured with 8, 12, 16, 32, or 64 ports). In the first stage of the enhanced hybrid CSI-RS, UE 800 measures the non-precoded CSI-RS and feeds back a compressed spatial covariance matrix, A, at 803. eNB 800 then transmits a UE-specific beamformed CSI-RS (e.g., configured with 1, 2, 4, or 8 ports) at 804. In the second stage of the enhanced hybrid CSI-RS, UE 800 measures the beamformed CSI-RS, which is precoded based on the spatial covariance feedback of the first-stage report and reports short-term CSI feedback, at 805. At 806, using both the covariance estimate and short-term CSI feedback, eNB 800 may configure data transmissions via PDSCH at 806.

Figure 9A:
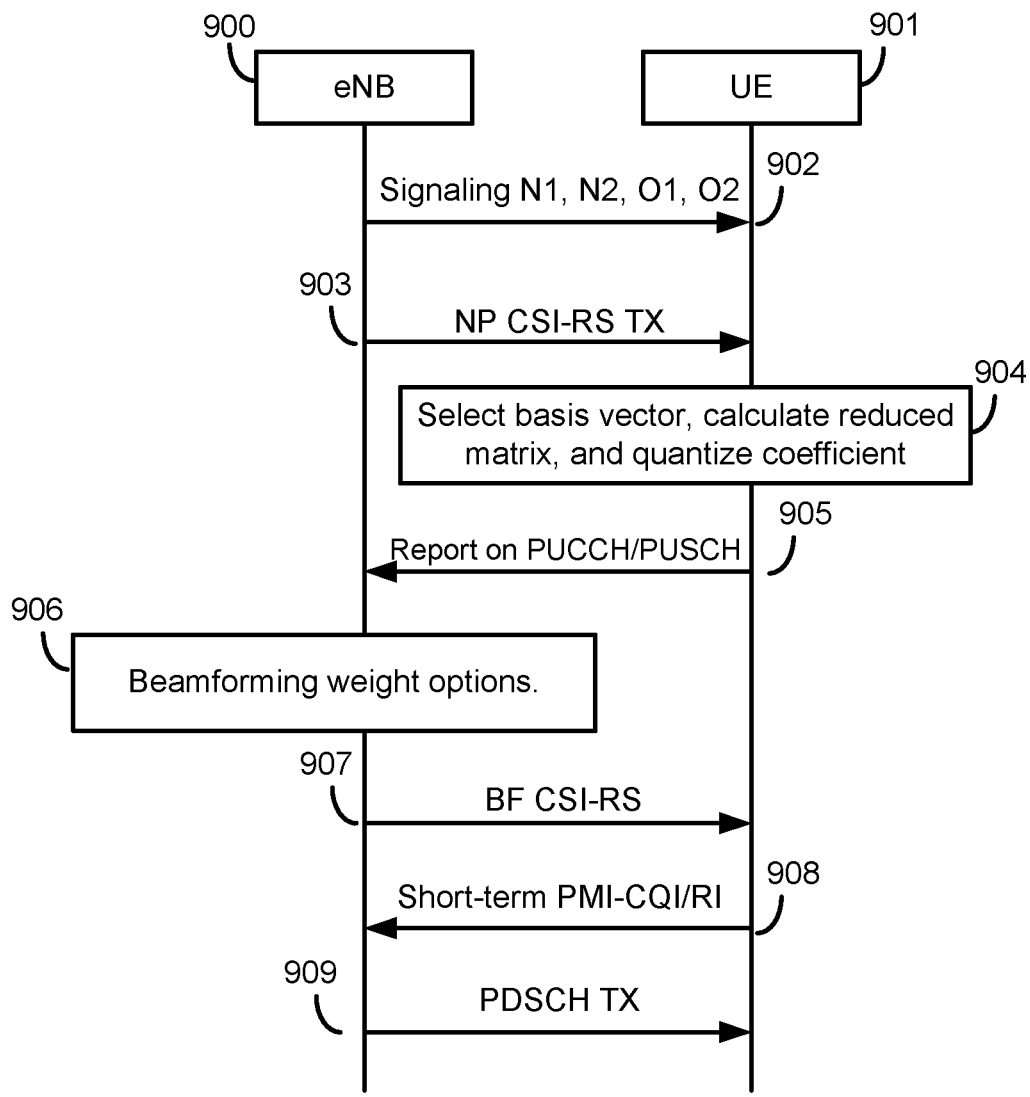
FIGS. 9A and 9B are block diagrams illustrating a call dialog between a UE and eNB configured according to aspects of the present disclosure.

FIG. 9A is a block diagram illustrating a communication dialog between an eNB 900 and a UE 901 configured according to one aspect of the present disclosure. At 902, eNB 900 signals the number of antenna ports in the elevation and azimuth dimension $(N_1, N_2)$ as well as the oversampling factors $(O_1, O_2)$. The transmission may occur, for example, via RRC signaling. At 903, eNB 900 transmits non-preceded CSI-RS. In the example aspect illustrated and described with respect to FIG. 9A, UE 901 selects the orthogonal basis vectors $\Psi$, at 904, and calculates the reduced dimension covariance estimate, A, along with the element-wise quantized coefficients.

At 905, UE 901 reports the covariance estimate, A, and the selected basis vectors, $\Psi$. via PUCCH/PUSCH. At 906, eNB 900 generates beamformed CSI-RS using beamforming weights. Two options can be used to precode the beamformed CSI-RS for the second stage of the enhanced hybrid CSI-RS feedback operations. In a first approach, the beamforming weight may be based on the reported DFT based basis vector, $\Psi$. (BF Weight=$\Psi$) In a second approach, the beamforming weight may be based on the eigenvector of the spatial covariance feedback. (BF Weight=$\Psi$eig(A)). The second approach may achieve better performance, however, for a channel with small angular spread, the eigenvector can be well approximated by a DFT vector and the first approach may then have similar performance as the second approach.

At 907, eNB 900 transmits the beamformed CSI-RS formed according to one of the two precoding approaches. At 908, UE 901 transmits short-term PMI-CQI/RI based on the beamformed CSI-RS. Using both stages of enhanced hybrid CSI-RS feedback, eNB 900 configures downlink data transmissions at 909 via PDSCH transmissions.

Figure 9B:
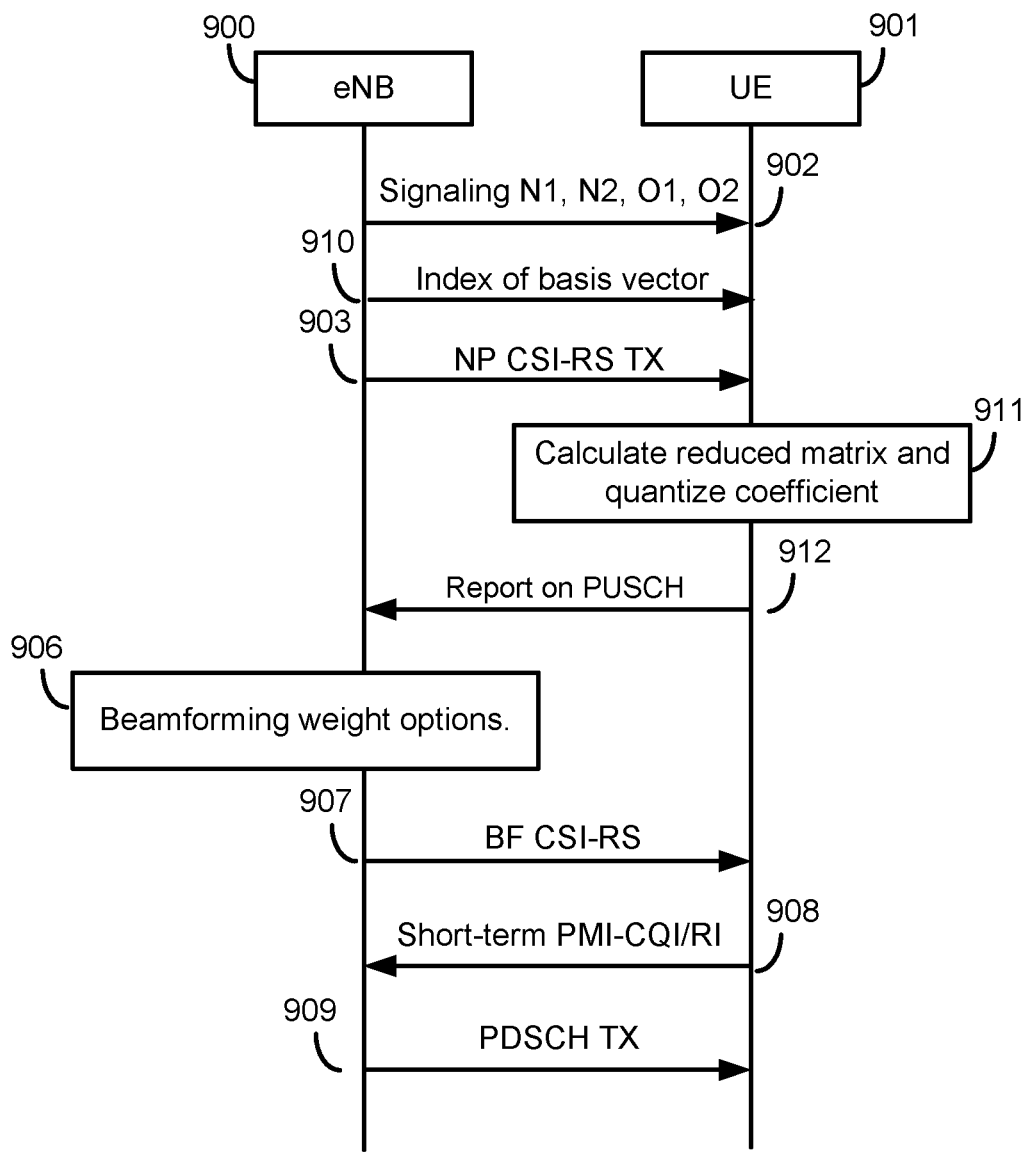

FIG. 9B is a block diagram illustrating a communication dialog between eNB 900 and UE 901 configured according to another aspect of the present disclosure. eNB 900 initiates the enhanced hybrid CSI-RS feedback operation again by transmitting the antenna numbers and oversampling factors at 902. In the additional aspect illustrated in FIG. 9B, eNB 900 configures the basis vectors by transmitting, at 910, the index of the basis vector to UE 901. As with the aspect illustrated in FIG. 9A, eNB 900 transmits a non-precoded CSI-RS. At 911, with the basis vectors configured by eNB 900, UE 901 calculates the reduced dimension covariance matrix, A, at element-wise quantized coefficients. UE 901 reports the covariance estimate via PUSCH at 912.

The remaining operations of the enhanced hybrid CSI-RS feedback are similar to those illustrated in FIG. 9A. At 906, using one of the precoding approaches, eNB 900 generates the beamformed CSI-RS and transmits it at 907. UE 901 will measure the beamformed CSI-RS and report the short-term PMI-CQI/RI at 908. Using both stages of CSI reports, eNB 900 configures downlink data transmissions via PDSCH at 909.

Those of skill in the art would understand that various aspects of the present disclosure may include different implementations, such as through non-transitory computer-readable media, which, when code stored thereon is executed by one or more computers or processors performs the features and functionality of the aspects, and such as through apparatuses that have one or more processors and memory coupled to the processors, such that when instructions are executed, the apparatus may be configured to perform the features and functionality of the aspects. The following aspects represent statements that reflect the various aspects of the present disclosure in different formats from the claims filed herewith.

The present disclosure comprises a first aspect, such as a non-transitory computer-readable medium having program code recorded thereon, the program code comprising:

program code for causing a computer to measure a non-precoded CSI-RS received from a base station;

program code for causing the computer to obtain a set of orthogonal basis vectors;

program code for causing the computer to measure a beamformed CSI-RS received from a base station;

program code for causing the computer to generate a CSI report based on measurement of the beamformed CSI-RS; and program code for causing the computer to transmit the CSI report to the base station.

Based on the first aspect, the non-transitory computer-readable medium of a second aspect, wherein the program code for causing the computer to obtain the set of orthogonal basis vectors includes:

program code for causing the computer to receive the set of orthogonal basis vectors from the base station, wherein the set of orthogonal basis vectors is based on an estimate of an uplink received signal.

Based on the first aspect, the non-transitory computer-readable medium of a third aspect, wherein the program code for causing the computer to obtain the set of orthogonal basis vectors includes:

program code for causing the computer to calculate a first set of discrete Fourier transform (DFT) vectors based on measurement of the non-precoded CSI-RS;

program code for causing the computer to identify a dominant DFT vector having a value that is largest of the first set of DFT vectors;

program code for causing the computer to determine a second set of DFT vectors orthogonal to the dominant DFT vector; and program code for causing the computer to generate the set of orthogonal basis vectors by removing a plurality of DFT vectors from the second set of DFT vectors with values below a threshold.

Based on the third aspect, the non-statutory computer-readable medium of a fourth aspect, further including:

program code for causing the computer to transmit an index of the dominant DFT vector and a set of indices of vectors in the set of orthogonal basis vectors.

Based on the first aspect, the non-statutory computer-readable medium of a fifth aspect further includes:

program code for causing the computer to determine a spatial covariance of the non-precoded CSI-RS;

program code for causing the computer to compress the spatial covariance into a spatial covariance estimate using the set of orthogonal basis vectors; and program code for causing the computer to transmit the spatial covariance estimate to the base station.

Based on the fifth aspect, the non-statutory computer-readable medium of a sixth aspect further includes:

program code for causing the computer to perform an element-wise quantization of the spatial covariance estimate prior to execution of the program code for causing the computer to transmit.

Based on the sixth aspect, the non-statutory computer-readable medium of a seventh aspect, wherein the element-wise quantization includes:

a first multibit uniform quantization for real entries of the spatial covariance estimate;

a second multibit uniform quantization for phase in [0, $2\pi$] for complex entries of the spatial covariance estimate; and a third multibit bit uniform quantization of an amplitude.

Based on the seventh aspect, the non-statutory computer-readable medium of an eighth aspect, wherein the first, second, and third multibit uniform quantizations are 4-bit uniform quantizations.

Based on the fifth aspect, the non-statutory computer-readable medium of a ninth aspect, wherein the program code for causing the computer to transmit the spatial covariance estimate occurs at a defined period and includes:

program code for causing the computer to transmit a first report including a rank corresponding to a number of vectors in the set of orthogonal basis vectors, wherein the first report is transmitted at a first period configured by higher layer signaling; and program code for causing the computer to transmit a second report including the set of orthogonal basis vectors, a beam index of each of the vectors in the spatial covariance estimate, wherein the second report is transmitted at a second period based in part on the first report.

Based on the ninth aspect, the non-statutory computer-readable medium of a tenth aspect, wherein the beam index of each of the vectors in the spatial covariance estimate are reported cyclically from the beam index for a first vector in the covariance estimate having a highest value to a last vector in the covariance estimate having a lowest value.

Based on the ninth aspect, the non-statutory computer-readable medium of an eleventh aspect further includes:

program code for causing the computer to receive a trigger signal for reporting the spatial covariance estimate to the base station, wherein the program code for causing the computer to transmit the spatial covariance estimate includes:

program code for causing the computer to transmit a number of vectors in the set of orthogonal basis vectors, a beam index of each of the vectors in the set of orthogonal basis vectors, an element-wise quantization of one or more matrix coefficients of the spatial covariance estimate.

Based on the eleventh aspect, the non-statutory computer-readable medium of a twelfth aspect, wherein the program code for causing the computer to transmit the beam index and the element-wise quantization of the one or more matrix coefficients is performed one of: separately or jointly in a same subframe, based on the trigger signal.

Based on the fifth aspect, the non-statutory computer-readable medium of a thirteenth aspect, wherein the beamformed CSI-RS is precoded based on one of: a set of DFT vectors of the set of orthogonal basis vectors in the spatial covariance estimate, or eigenvectors of the covariance estimate.

The present disclosure comprises a fourteenth aspect which further comprises the non-transitory computer-readable medium of any combination the first through thirteenth aspects.

Based on a fifteenth aspect, an apparatus configured for wireless communication comprises:
at least one processor; and
a memory coupled to the at least one processor,
wherein the at least one processor is configured:
to measure a non-precoded CSI-RS received from a base station;
to obtain a set of orthogonal basis vectors;
to measure a beamformed CSI-RS received from a base station;
to generate a CSI report based on measurement of the beamformed CSI-RS; and
to transmit the CSI report to the base station.

Based on the fifteenth aspect, the apparatus configured for wireless communication of a sixteenth aspect, wherein the configuration of the at least one processor to obtain the set of orthogonal basis vectors includes configuration to receive the set of orthogonal basis vectors from the base station, wherein the set of orthogonal basis vectors is based on an estimate of an uplink received signal.

Based on the fifteenth aspect, the apparatus configured for wireless communication of a seventeenth aspect, wherein the configuration of the at least one processor to obtain the set of orthogonal basis vectors includes configuration of the at least one processor:
to calculate a first set of discrete Fourier transform (DFT) vectors based on measurement of the non-precoded CSI-RS;
to identify a dominant DFT vector having a value that is largest of the first set of DFT vectors;
to determine a second set of DFT vectors orthogonal to the dominant DFT vector; and
to generate the set of orthogonal basis vectors by removing a plurality of DFT vectors from the second set of DFT vectors with values below a threshold.

Based on the seventeenth aspect, the apparatus configured for wireless communication of a eighteenth aspect, further includes configuration of the at least one processor to transmit an index of the dominant DFT vector and a set of indices of vectors in the set of orthogonal basis vectors.

Based on the fifteenth aspect, the apparatus configured for wireless communication of a nineteenth aspect further includes configuration of the at least one processor:
to determine a spatial covariance of the non-preceded CSI-RS;
to compress the spatial covariance into a spatial covariance estimate using the set of orthogonal basis vectors; and
to transmit the spatial covariance estimate to the base station.

Based on the nineteenth aspect, the apparatus configured for wireless communication of a twentieth aspect further includes configuration of the at least one processor to perform an element-wise quantization of the spatial covariance estimate prior to execution of the configuration of the at least one processor to transmit.

Based on the twentieth aspect, the apparatus configured for wireless communication of a twenty-first aspect, wherein the element-wise quantization includes:
a first multibit uniform quantization for real entries of the spatial covariance estimate;
a second multibit uniform quantization for phase in $[0, 2\pi]$ for complex entries of the spatial covariance estimate; and
a third multibit bit uniform quantization of an amplitude.

Based on the twenty-first aspect, the apparatus configured for wireless communication of a twenty-second aspect, wherein the first, second, and third multibit uniform quantizations are 4-bit uniform quantizations.

Based on the nineteenth aspect, the apparatus configured for wireless communication of a twenty-third aspect, further includes configuration of the at least one processor:
to transmit a first report including a rank corresponding to a number of vectors in the set of orthogonal basis vectors, wherein the first report is transmitted at a first period configured by higher layer signaling; and
to transmit a second report including the set of orthogonal basis vectors, a beam index of each of the vectors in the spatial covariance estimate, wherein the second report is transmitted at a second period based in part on the first report.

Based on the twenty-third aspect, the apparatus configured for wireless communication of a twenty-fourth aspect, wherein the beam index of each of the vectors in the spatial covariance estimate are reported cyclically from the beam index for a first vector in the spatial covariance estimate having a highest value to a last vector in the covariance estimate having a lowest value.

Based on the nineteenth aspect, the apparatus configured for wireless communication of a twenty-fifth aspect further includes configuration of the at least one processor to receive a trigger signal for reporting the spatial covariance estimate to the base station, wherein the configuration of the at least one processor to transmit the spatial covariance estimate includes configuration to transmit a number of vectors in the set of orthogonal basis vectors, a beam index of each of the vectors in the set of orthogonal basis vectors, an element-wise quantization of one or more matrix coefficients of the spatial covariance estimate.

Based on the twenty-fifth aspect, the apparatus configured for wireless communication of a twenty-sixth aspect, wherein the configuration of the at least one processor to transmit the beam index and the element-wise quantization of the one or more matrix coefficients is performed one of: separately or jointly in a same subframe, based on the trigger signal.

Based on the nineteenth aspect, the apparatus configured for wireless communication of a twenty-seventh aspect, wherein the beamformed CSI-RS is precoded based on one of: a set of DFT vectors of the set of orthogonal basis vectors, or eigenvectors of the spatial covariance estimate.

The present disclosure comprises a twenty-eighth aspect which further comprises the apparatus configured for wireless communication of any combination the fifteenth through twenty-seventh aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
measuring a non-precoded channel state information (CSI) reference signal (CSI-RS) received from a base station;
obtaining a set of orthogonal basis vectors;
determining a spatial covariance matrix of the non-precoded CSI-RS;
compressing the spatial covariance matrix into a spatial covariance estimate matrix by projecting one or more eigenvectors of the spatial covariance matrix on the set of orthogonal basis vectors;
transmitting the spatial covariance estimate matrix and a beam index of each of the vectors in the set of orthogonal basis vectors to the base station;

measuring a beamformed CSI-RS received from the base station;

generating a CSI report based on measurement of the beamformed CSI-RS; and transmitting the CSI report to the base station.

2. The method of claim 1, wherein the obtaining the set of orthogonal basis vectors includes:

receiving the set of orthogonal basis vectors from the base station, wherein the set of orthogonal basis vectors is based on an estimate of an uplink received signal.

3. The method of claim 1, wherein the obtaining the set of orthogonal basis vectors includes:

calculating a first set of discrete Fourier transform (DFT) vectors based on measurement of the non-precoded CSI-RS;

identifying a dominant DFT vector having a value that is largest of the first set of DFT vectors;

determining a second set of DFT vectors orthogonal to the dominant DFT vector; and generating the set of orthogonal basis vectors by removing a plurality of DFT vectors from the second set of DFT vectors with values below a threshold.

4. The method of claim 3, further including: transmitting an index of the dominant DFT vector to the base station.

5. The method of claim 1, further including: performing an element-wise quantization of the spatial covariance estimate matrix prior to the transmitting.

6. The method of claim 5, wherein the element-wise quantization includes:

a first multibit uniform quantization for real entries of the spatial covariance estimate matrix;

a second multibit uniform quantization for phase in $[0, 2\pi]$ for complex entries of the spatial covariance estimate matrix; and a third multibit bit uniform quantization of an amplitude.

7. The method of claim 6, wherein the first, second, and third multibit uniform quantizations are 4-bit uniform quantizations.

8. The method of claim 1, wherein the transmitting the spatial covariance estimate matrix and the beam index of each of the vectors in the set of orthogonal basis vectors occurs according to a defined period and includes:

transmitting a first report including a rank corresponding to a number of vectors in the set of orthogonal basis vectors, wherein the first report is transmitted according to a first period configured by higher layer signaling; and transmitting a second report including the set of orthogonal basis vectors and the beam index of each of the vectors in the set of orthogonal basis vectors, wherein the second report is transmitted according to a second period based in part on the first report.

9. The method of claim 8, wherein the beam index of each of the vectors in the spatial covariance estimate matrix are reported cyclically from the beam index for a first vector in the spatial covariance estimate matrix having a highest value to a last vector in the spatial covariance estimate matrix having a lowest value.

10. The method of claim 1, further including: receiving a trigger signal for reporting the spatial covariance estimate matrix to the base station, wherein the transmitting the spatial covariance estimate matrix and the beam index of each of the vectors in the set of orthogonal basis vectors is based on the trigger signal and includes:

separately transmitting a number of vectors in the set of orthogonal basis vectors, the beam index of each of the vectors in the set of orthogonal basis vectors, and an element-wise quantization of one or more matrix coefficients of the spatial covariance estimate matrix.

11. The method of claim 1, further including:

receiving a trigger signal for reporting the spatial covariance estimate matrix to the base station, wherein the transmitting the spatial covariance estimate matrix and the beam index of each of the vectors in the set of orthogonal basis vectors is based on the trigger signal and includes:

jointly transmitting, in a same subframe, a number of vectors in the set of orthogonal basis vectors, the beam index of each of the vectors in the set of orthogonal basis vectors, and an element-wise quantization of one or more matrix coefficients of the spatial covariance estimate matrix.

12. The method of claim 1, wherein the beamformed CSI-RS is precoded at the base station based on a set of DFT vectors in the set of orthogonal basis vectors.

13. An apparatus configured for wireless communication, comprising:

means for measuring a non-precoded channel state information (CSI) reference signal (CSI-RS) received from a base station;

means for obtaining a set of orthogonal basis vectors;

means for determining a spatial covariance matrix of the non-precoded CSI-RS;

means for compressing the spatial covariance matrix into a spatial covariance estimate matrix by projecting one or more eigenvectors of the spatial covariance matrix on the set of orthogonal basis vectors;

means for transmitting the spatial covariance estimate matrix and a beam index of each of the vectors in the set of orthogonal basis vectors to the base station;

means for measuring a beamformed CSI-RS received from the base station;

means for generating a CSI report based on measurement of the beamformed CSI-RS; and means for transmitting the CSI report to the base station.

14. The apparatus of claim 13, wherein the means for obtaining the set of orthogonal basis vectors includes:

means for receiving the set of orthogonal basis vectors from the base station, wherein the set of orthogonal basis vectors is based on an estimate of an uplink received signal.

15. The apparatus of claim 13, wherein the means for obtaining the set of orthogonal basis vectors includes:

means for calculating a first set of discrete Fourier transform (DFT) vectors based on measurement of the non-precoded CSI-RS;

means for identifying a dominant DFT vector having a value that is largest of the first set of DFT vectors;

means for determining a second set of DFT vectors orthogonal to the dominant DFT vector; and means for generating the set of orthogonal basis vectors by removing a plurality of DFT vectors from the second set of DFT vectors with values below a threshold.

16. The apparatus of claim 15, further including:

means for transmitting an index of the dominant DFT vector to the base station.

17. The apparatus of claim 13, further including:

means for performing an element-wise quantization of the spatial covariance estimate matrix prior to executing the means for transmitting.

18. The apparatus of claim 17, wherein the element-wise quantization includes:

a first multibit uniform quantization for real entries of the spatial covariance estimate matrix;

a second multibit uniform quantization for phase in [0, 2π] for complex entries of the spatial covariance estimate matrix; and a third multibit bit uniform quantization of an amplitude, wherein the first, second, and third multibit uniform quantizations are 4-bit uniform quantizations.

19. The apparatus of claim 13, wherein transmission of the spatial covariance estimate matrix and the beam index of each of the vectors in the set of orthogonal basis vectors occurs according to a defined period, and wherein the means for transmitting the spatial covariance estimate matrix and the beam index of each of the vectors in the set of orthogonal basis vectors includes:

means for transmitting a first report including a rank corresponding to a number of vectors in the set of orthogonal basis vectors, wherein the first report is transmitted according to a first period configured by higher layer signaling; and means for transmitting a second report including the set of orthogonal basis vectors and the beam index of each of the vectors in the set of orthogonal basis vectors, wherein the second report is transmitted according to a second period based in part on the first report.

20. The apparatus of claim 13, further including: means for receiving a trigger signal for reporting the spatial covariance estimate matrix to the base station, wherein the means for transmitting the spatial covariance estimate matrix and the beam index of each of the vectors in the set of orthogonal basis vectors includes:

means for separately transmitting a number of vectors in the set of orthogonal basis vectors, the beam index of each of the vectors in the set of orthogonal basis vectors, and an element-wise quantization of one or more matrix coefficients of the spatial covariance estimate matrix.

21. The apparatus of claim 13, further including:

means for receiving a trigger signal for reporting the spatial covariance estimate matrix to the base station, wherein the means for transmitting the spatial covariance estimate matrix and the beam index of each of the vectors in the set of orthogonal basis vectors includes:

means for jointly transmitting, in a same subframe, a number of vectors in the set of orthogonal basis vectors, the beam index of each of the vectors in the set of orthogonal basis vectors, and an element-wise quantization of one or more matrix coefficients of the spatial covariance estimate matrix.

22. The apparatus of claim 13, wherein the beamformed CSI-RS is precoded at the base station based on one of: a set of DFT vectors in the set of orthogonal basis vectors, or one or more eigenvectors of the spatial covariance estimate matrix.

23. An apparatus configured for wireless communication, the apparatus comprising:

at least one processor; and a memory coupled to the at least one processor, the at least one processor configured to:

measure a non-precoded channel state information (CSI) reference signal (CSI-RS) received from a base station;

obtain a set of orthogonal basis vectors;

determine a spatial covariance matrix of the non-precoded CSI-RS;

compress the spatial covariance matrix into a spatial covariance estimate matrix by projecting one or more eigenvectors of the spatial covariance matrix on the set of orthogonal basis vectors;

initiate transmission of the spatial covariance estimate matrix and a beam index of each of the vectors in the set of orthogonal basis vectors to the base station;

measure a beamformed CSI-RS received from the base station;

generate a CSI report based on measurement of the beamformed CSI-RS; and initiate transmission of the CSI report to the base station.

24. The method of claim 1, wherein the beamformed CSI-RS is precoded at the base station based on the one or more eigenvectors of the spatial covariance estimate matrix.

25. The method of claim 1, wherein each of the vectors in the set of orthogonal basis vectors is orthogonal to at least one discrete Fourier transform (DFT) vector corresponding to the non-precoded CSI-RS.

* * * * *